United States Patent
Ueki et al.

(10) Patent No.: US 9,209,502 B2
(45) Date of Patent: Dec. 8, 2015

(54) NON-AQUEOUS ELECTROLYTE SECONDARY BATTERY AND VEHICLE

(75) Inventors: Tomoyoshi Ueki, Toyota (JP); Harunari Shimamura, Moriguchi (JP); Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 136 days.

(21) Appl. No.: 14/004,440

(22) PCT Filed: Mar. 16, 2011

(86) PCT No.: PCT/JP2011/056307
§ 371 (c)(1),
(2), (4) Date: Sep. 11, 2013

(87) PCT Pub. No.: WO2012/124093
PCT Pub. Date: Sep. 20, 2012

(65) Prior Publication Data
US 2014/0004400 A1    Jan. 2, 2014

(51) Int. Cl.
*H01M 2/14* (2006.01)
*H01M 10/658* (2014.01)
*H01M 2/16* (2006.01)
*H01M 10/052* (2010.01)

(52) U.S. Cl.
CPC .......... *H01M 10/5087* (2013.01); *H01M 2/166* (2013.01); *H01M 2/1646* (2013.01); *H01M 2/1653* (2013.01); *H01M 2/1686* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,691,077 A * | 11/1997 | Yu | 429/62 |
| 2008/0182174 A1* | 7/2008 | Carlson et al. | 429/251 |
| 2008/0213670 A1 | 9/2008 | Okada et al. | |
| 2010/0203396 A1 | 8/2010 | Murata | |
| 2011/0165469 A1 | 7/2011 | Nishikawa | |

FOREIGN PATENT DOCUMENTS

| | | |
|---|---|---|
| CN | 101237069 | 8/2008 |
| JP | 2008-251527 | 10/2008 |
| JP | 2008-300362 | 12/2008 |
| JP | 2010-056036 | 3/2010 |
| JP | 2010-240936 | 10/2010 |
| JP | 2011-23186 | 2/2011 |
| WO | WO 2008/149986 A1 | 12/2008 |
| WO | WO 2012/049748 A1 | 4/2012 |

* cited by examiner

*Primary Examiner* — Cynthia K Walls
(74) *Attorney, Agent, or Firm* — Finnegan, Henderson, Farabow, Garrett & Dunner, LLP

(57) ABSTRACT

The present invention provides a non-aqueous electrolyte secondary battery with great high-rate discharge properties while being less susceptible to an extensive internal short circuit and likely to provide proper assembly. The non-aqueous electrolyte secondary battery comprises a separator (13) placed between a positive electrode and a negative electrode. Separator (13) comprises a porous resin layer (60), and a porous heat-resistant layer (70) overlaid at least on a first face of resin layer (60). Heat-resistant layer (70) comprises a filler consisting of an inorganic material, and a binder. Heat-resistant layer (70) has a porosity of 55% or higher. Heat-resistant layer (70) exhibits a 90° peel strength of 2.9 N/m to 15.1 N/m to the resin layer (60).

5 Claims, 4 Drawing Sheets

NON-AQUEOUS ELECTROLYTE SECONDARY BATTERY AND VEHICLE

CROSS-REFERENCE TO RELATED APPLICATIONS

This application is a national phase application of International Application No. PCT/JP2011/056307, filed Mar. 16, 2011, the content of which is incorporated herein by reference.

TECHNICAL FIELD

The present invention relates to a non-aqueous electrolyte secondary battery and a vehicle.

BACKGROUND ART

Non-aqueous electrolyte secondary batteries such as lithium-ion secondary batteries and the like have gained greater interest as, for example, power supplies loaded on motor-driven vehicles or power sources loaded on personal computers, mobile devices and other electric products, etc.

A non-aqueous electrolyte secondary battery comprises an electrode body comprising a positive electrode, a negative electrode, and a porous separator placed between the positive electrode and the negative electrode. The separator works to prevent short circuits associated with direct contact between the positive electrode and the negative electrode. With the micropores of the separator being impregnated with an electrolyte, the separator also serves to form an ion-conducting channel (conduction path) between the two electrodes.

Conventionally, for the separator, a film having a porous resin layer formed from polyethylene (PE) or polypropylene (PP), etc., has been used. In such a separator, when the battery temperature is elevated excessively by an internal short circuit, etc., the resin melts to close the micropores, and the ionic conduction between the two electrodes is blocked. Thus, charging and discharging of the battery are forced to stop, preventing further temperature elevation. Such function of the separator is referred to as a shutdown function. With the separator having a shutdown function, overheating of the battery is prevented.

However, since the resin layer is porous, a temperature increase causes thermal contraction. A large degree of thermal contraction may lead to occurrence of a local short circuit due to a film rupture, etc., which may turn into a more extensive short circuit. In order to prevent short circuits due to thermal contraction of the resin layer, it has been suggested to form a porous heat-resistant layer on the resin layer surface. Patent Document 1 discloses such a separator.

For example, a non-aqueous electrolyte secondary battery used as a vehicle-driving power supply, etc., is expected to have great discharge properties at high rates. In order to increase the high-rate discharge properties, it is important to increase the ionic conductivity of the separator. However, a lower porosity in the heat-resistant layer tends to decrease the ionic conductivity of the separator. In order to increase the high-rate discharge properties, it is preferable that the heat-resistant layer has a high porosity. Patent Document 1 discloses a heat-resistant layer having a porosity of 40 to 60%.

CITATION LIST

Patent Literature

[Patent Document 1] Japanese Patent Application Publication No. 2008-300362

SUMMARY OF INVENTION

Technical Problem

However, as the porosity of the heat-resistant layer increases, the contact area between the heat-resistant layer and the resin layer becomes smaller; and therefore, the peel strength of the heat-resistant layer tends to decrease. For instance, when an internal short circuit occurs due to a foreign body incorporated into the battery, the energy released upon the occurrence of the short circuit may cause the heat-resistant layer to peel off the resin layer. When this happens, the thermal contraction of the resin layer cannot be suppressed, possibly leading to an extensive short circuit.

To prevent peeling of the heat-resistant layer upon occurrence of a short circuit, one may consider increasing the peel strength of the heat-resistant layer. However, simply increasing the peel strength of the heat-resistant layer will lower the flexibility of the separator, making the electrode body difficult to handle during battery assembly, and misalignment of the positive electrode, separator and negative electrode is likely to occur.

An objective of the present invention is to provide a non-aqueous electrolyte secondary battery having great high-rate discharge properties and being less susceptible to an extensive internal short circuit while being easy to properly assemble.

Solution to Problem

The present invention provides a non-aqueous electrolyte secondary battery comprising a positive electrode, a negative electrode, a separator placed between the positive electrode and the negative electrode, and a non-aqueous electrolyte impregnated at least in the separator. The separator comprises a porous resin layer, and a porous heat-resistant layer overlaid at least on a first face of the resin layer. The heat-resistant layer comprises a filler consisting of an inorganic material, and a binder. The heat-resistant layer has a porosity of 55% or higher. The heat-resistant layer exhibits a 90° peel strength of 2.9 N/m to 15.1 N/m to the resin layer. As used herein, the term "non-aqueous electrolyte secondary battery" refers to a secondary battery comprising a non-aqueous electrolyte (typically, an electrolyte containing a supporting salt (supporting electrolyte) in a non-aqueous solvent). According to the present invention, a non-aqueous electrolyte secondary battery can be obtained with great high-rate discharge properties while being less susceptible to an extensive internal short circuit and likely to provide proper assembly.

In a preferable embodiment of the art disclosed herein, the heat-resistant layer has a porosity of 55% to 68%. By this, even greater high-rate discharge properties can be obtained.

In another preferable embodiment of the art disclosed herein, the heat-resistant layer exhibits a 90° peel strength of 6 N/m to 15.1 N/m to the resin layer. This increases the durability of the non-aqueous electrolyte secondary battery.

In another preferable embodiment disclosed herein, the filler has an average particle diameter of 0.3 μm to 0.7 μm. The filler may have an average particle diameter of 0.3 μm to 0.5 μm. This can further increase the peel strength of the heat-resistant layer.

In another preferable embodiment disclosed herein, the filler and the binder have a weight ratio of 93:7 to 95:5. This can further increase the peel strength of the heat-resistant layer.

While the material of the filler is not particularly limited, it may consist of at least one species of material selected from a group consisting of alumina, boehmite, magnesium hydroxide and magnesium carbonate.

The positive electrode, the separator and the negative electrode may be overlaid on top of each other and wound. This is because since the separator is sufficiently flexible, the positive electrode, the separator and the negative electrode are less likely to have winding misalignment.

The present invention provides a vehicle comprising the non-aqueous electrolyte secondary battery as a driving power supply. The non-aqueous electrolyte secondary battery has great high-rate discharge properties; and therefore, it can be preferably used as a driving power supply in a vehicle,

DESCRIPTION OF EMBODIMENTS

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

Figure 1:
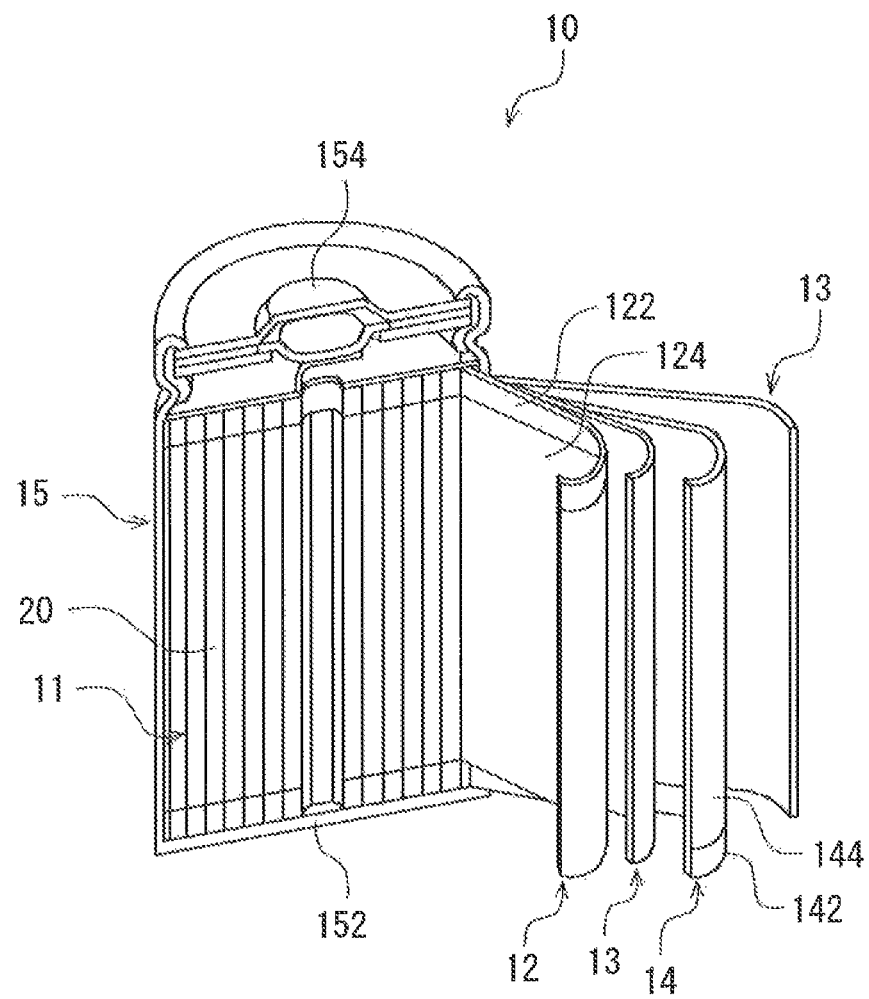
FIG. 1 shows a perspective cutaway view of a lithium-ion secondary battery according to an embodiment.

FIG. 1 shows a lithium-ion secondary battery 10 as a non-aqueous electrolyte secondary battery according to an embodiment of the present invention. Lithium-ion secondary battery 10 has a constitution where an electrode body 11 and a non-aqueous electrolyte solution 20 are contained in a battery case 15. Electrode body 11 is constituted with a positive electrode 12, a negative electrode 14 and a separator 13. At least part of non-aqueous electrolyte solution 20 is impregnated in electrode body 11.

Positive electrode 12 comprises a long sheet of positive current collector 122, and a positive electrode material layer 124 that comprises a positive electrode active material and is provided on top of positive current collector 122. Negative electrode 14 comprises a long sheet of negative current collector 142, and a negative electrode material layer 144 that comprises a negative electrode active material and is provided on top of negative current collector 142. Like positive electrode 12 and negative electrode 14, separator 13 is formed as a long sheet. Positive electrode 12 and negative electrode 14 are wound into a cylinder along with two sheets of separator 13 in such a way that separator 13 is present between the two electrodes. The shape of wound electrode body 11 is not limited to a cylinder. For instance, after positive electrode 12, separator 13 and negative electrode 14 are wound, it can be laterally compressed to have a flattened shape.

Battery case 15 comprises a bottomed cylindrical case body 152 and a lid 154 to close the opening of the case body 152. Lid 154 and case body 152 are both made of metal and insulated from each other. Lid 154 is electrically connected to positive current collector 122 while case body 152 is electrically connected to negative current collector 142. In this lithium-ion secondary battery 10, lid 154 and case body 152 also serve as a positive terminal and a negative terminal, respectively.

Positive current collector 122 has a region at an edge (the top edge in FIG. 1) along the length direction where positive current collector 122 is exposed with no presence of positive electrode material layer 124. To the exposed region, lid 154 is electrically connected. Negative current collector 142 has a region at an edge (the bottom edge in FIG. 1) along the length direction where negative current collector 142 is exposed with no presence of negative electrode material layer 144. To this exposed region, case body 152 is electronically connected.

The non-aqueous electrolyte solution contains a lithium salt as a supporting salt in an organic solvent (non-aqueous solvent). As the lithium salt, for instance, a suitable one(s) can be selected and used among known lithium salts that have been conventionally used as supporting salts in non-aqueous electrolyte solutions for lithium-ion secondary batteries. Examples of such lithium salts include $LiPF_6$, $LiBF_4$, $LiClO_4$, $LiAsF_6$, $Li(CF_3SO_2)_2N$, $LiCF_3SO_3$ and the like. As the non-aqueous solvent, a suitable one(s) can be selected and used among organic solvents used in common lithium-ion secondary batteries. Examples of particularly preferable non-aqueous solvents include carbonates such as ethylene carbonate (EC), dimethyl carbonate (DMC), ethyl methyl carbonate (EMC), diethyl carbonate (DEC), propylene carbonate (PC), and the like.

As positive current collector 122, can be preferably used a conductive material formed of a metal having good conductivity. For instance, aluminum or an alloy containing aluminum as the primary component can be used. Positive electrode material layer 124 may comprise, in addition to a positive electrode active material, a conductive material, and a binder, etc., as needed. As the positive electrode active material, a material capable of storing and releasing lithium is used, and one, two or more species can be used among the substances (e.g., oxides having a layered structure or a spinel structure) conventionally used in lithium-ion secondary batteries without particular limitations. Examples include lithium-containing composite oxides such as lithium nickel-based composite oxides, lithium cobalt-based composite oxides, lithium manganese-based composite oxides, lithium magnesium-based composite oxides, and the like. As the conductive material, can be preferably used carbon materials such as carbon black (e.g., acetylene black), graphite powder and the like. As the binder, can be used polyvinylidene fluoride (PVDF), carboxymethyl cellulose (CMC), styrene-butadiene rubber (SBR), and the like.

As negative current collector 142, can be preferably used a conductive material formed of a metal having good conductivity. For instance, copper or an alloy containing copper as the primary component can be used. Negative electrode material layer 144 may comprise, in addition to a negative electrode active material, a conductive material similar to those for positive electrode material layer 124, and a binder, etc., as needed. As the negative electrode active material, can be used one, two or more species among the substances conventionally used in lithium-ion secondary batteries without particular limitations. Examples of a preferable negative electrode active material include carbon particles. A preferable particulate carbon material (carbon particles) contains a graphite structure (layered structure) at least partially. Any carbon material among so-called graphitic substances (graphites), hard-to-graphitize carbonaceous substances (hard carbons), easy-to-graphitize carbonaceous substances (soft carbons) and substances having a structure combining these can be preferably used.

Separator 13 is described next. As described earlier, in the present embodiment, separator 13 is formed as a long sheet. However, since the shape of separator 13 may vary according to the shape, etc., of the lithium-ion secondary battery, it is not particularly limited to a sheet form. Similarly, the shapes of positive electrode 12 and negative electrode 14 are not to be limited to sheet forms.

Figure 2:
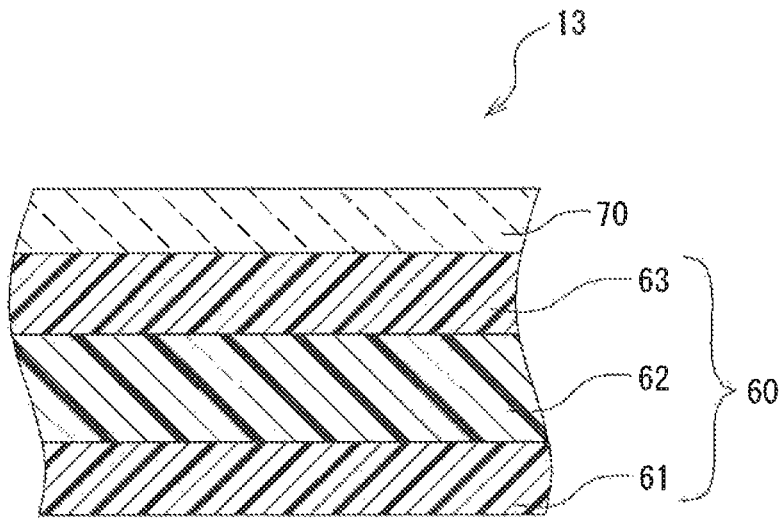
FIG. 2 shows a cross-sectional view of a separator according to an embodiment.
Figure 3:
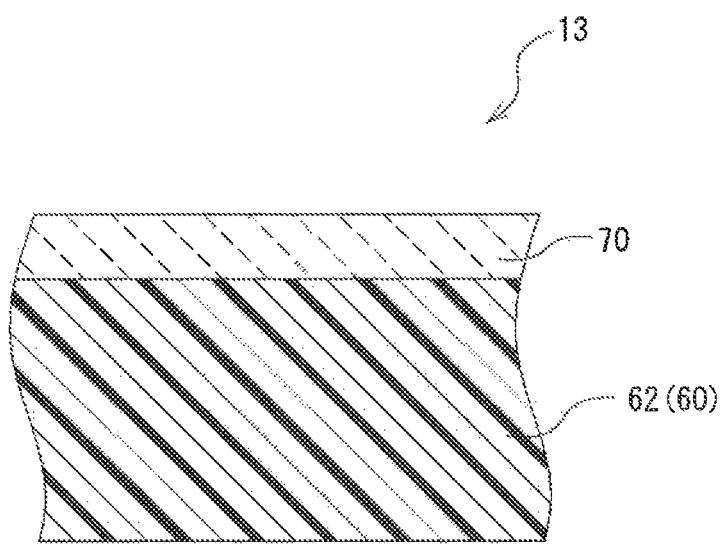
FIG. 3 shows a cross-sectional view of a separator according to another embodiment.

FIG. 2 shows separator 13 according to an embodiment while FIG. 3 shows separator 13 according to another embodiment. As shown in FIG. 2 and FIG. 3, separator 13 comprises a porous resin layer 60 and a porous heat-resistant layer 70 formed on a surface of resin layer 60. Heat-resistant layer 70 serves to suppress the thermal contraction of resin layer 60 and prevent internal short circuits caused by a film rupture of resin layer 60. Heat-resistant layer 70 may be provided on a first face of resin layer 60 or on each face thereof.

As the material of resin layer 60, can be suitably used, for instance, polyolefin-based resins such as PE (polyethylene), PP (polypropylene), and the like. Resin layer 60 may have a single-layer structure or a multi-layer structure. FIG. 2 shows an example of separator 13 comprising resin layer 60 that has a three-layer structure. Herein, resin layer 60 is constituted with PP layer 61, PE layer 62 overlaid on top of PP layer 61, and PP layer 63 overlaid on top of PE layer 62. It is noted that the number of layers in a multi-layered structure is not limited to three, and it can be two, four or a larger number. FIG. 3 shows an example of separator 13 comprising resin layer 60 that has a single-layer structure. Herein, resin layer 60 is constituted with a PE layer 62.

As resin layer 60, or instance, a un-axially stretched or bi-axially stretched porous resin film can be preferably used. Among these, a porous resin film uni-axially stretched in the length direction is particularly preferable as it has suitable strength with a lower degree of thermal contraction in the width direction. With use of a separator comprising a uni-axially stretched porous resin film, in an embodiment where it is wound along with long sheets of positive electrode and negative electrode, thermal contraction in the length direction may be suppressed as well. Thus, a porous resin film uni-axially stretched in the length direction is particularly preferable as a member of a separator constituting such a wound electrode body.

While the thickness of resin layer 60 is not particularly limited, in typical, it is preferably about 10 µm to 30 µm. When resin layer 60 is excessively thick, the ionic conductivity of separator 13 tends to decrease. When resin layer 60 is excessively thin, it tends to be more susceptible to film rupture. The thickness of resin layer 60 can be determined by analyzing its images taken with a scanning electron microscope (SEM).

Heat-resistant layer 70 comprises an inorganic oxide or inorganic hydroxide filler and a binder. The filler and the binder are mixed in a solvent to prepare a composition for forming heat-resistant layers, and the composition is applied to a surface of resin layer 60 and allowed to dry to form wheat-resistant layer 70.

As the filler, can be preferably used a highly electrically insulating particulate material consisting of an inorganic oxide or inorganic hydroxide having a melting point higher than PP layers 61, 63 and PE layer 62. For example, can be used one, two or more species selected from alumina, boehmite, magnesium hydroxide, magnesium carbonate, magnesia, titania, silica, zirconia, zinc oxide, iron oxide, ceria, yttria, and the like prepared in a particle form.

The form of filler is not particularly limited, and it may take forms of, for example, particles, fibers, flakes, and so on. Preferably, the filler in a form of particles is used. The filler can have an average particle diameter of, for instance, about 0.15 µm to 2 µm, preferably 0.3 µm to 0.7 µm, or more preferably 0.3 µm to 0.5 µm. The filler has a specific surface area of, for instance, about 2 $m^2/g$ to 13 $m^2/g$. In the present description, the term "average particle diameter" refers to a 50th percentile value of particle diameter (or abbreviated to $D_{50}$ hereinafter) in a size distribution obtained by laser scattering diffraction analysis.

For the binder, for example, can be used acrylic resins (e.g., a resin comprising an acrylate polymer as the primary component), styrene-butadiene; rubber (SBR), polyolefin-based resins such as PE and PP, etc., cellulose-based resins such as carboxymethyl cellulose (CMC), etc., fluorine-based resins such as polyvinylidene fluoride (PVDF), and the like. These binders can be used a single species solely or a combination of two or more species.

The form of binder is not particularly limited, and it can be used as particles (as powder) with no further processing. Alternatively, a binder prepared as a solution or an emulsion can be used. Two or more species of binder can be used in different forms. When a binder in a particle form is used, its average particle diameter is not particularly limited. For example, it can have an average particle diameter of about 0.05 µm to 0.5 µm.

The filler and the binder may be contained at a weight ratio (based on NV) of, for instance, 90:10 to 99:1, preferably 93:7 to 97:3, or more preferably 93:7 to 95:5 When the binder content is excessively low, the anchoring of heat-resistant layer 70 or the strength (shape stability) of heat-resistant layer 70 itself may decrease, resulting in a defect such as cracking or peeling, etc. When the binder content is excessively high, the porosity of heat-resistant layer 70 may become lower, or the ionic permeability of separator 13 may decrease. In a preferable embodiment, the total amount of the filler and the binder contained in the entire heat-resistant layer 70 is about 90 weight % (wt %) or greater (e.g., 95% or greater). Heat-resistant layer 70 may consist essentially of a filler and a binder.

The solvent for dissolving or dispersing the filler and the binder is not particularly limited. For example, a suitable solvent can be selected and used among water, alcohols such as ethanol and the like, N-methyl-2-pyrrolidone (NMP), toluene, dimethyl carbonate (DMC), ethyl methyl carbonate (EMC) and the like.

The solid content of the heat-resistant layer-forming composition is, for instance, about 30 wt % to 50 wt %. The solid content is typically around 40 wt % in a solvent-based composition and 50 wt % to 52 wt % in an aqueous composition. It is noted that the solid content is obviously not limited to these values.

When necessary, as far as the functions of separator 13 and the performance of the secondary battery 10 are not impaired, the heat-resistant layer-forming composition may contain various additives such as surfactants, wetting agents, dispersants, thickeners, defoamers, pH adjusting agents (acid, base, etc.) and so on.

The method for applying the heat-resistant layer-forming composition to resin layer 60 is not particularly limited. It can be carried out, for instance, with a die coater, gravure roll coater, reverse roll coater, kiss roll coater, dip roll coater, bar coater, air-knife coater, spray coater, brush coater, screen coater, and so on.

The drying process after the application can be carried out by a suitably selected conventionally known method. Examples include a method where drying is carried out at a temperature (e.g., about 70° C. to 100° C.) lower than the melting point of PE layer 62, a method where drying is carried out by storing it at a low temperature under reduced pressure, and like methods.

The thickness of heat-resistant layer 70 after dried can be, for instance, about 1 μm to 12 μm, or preferably about 2 μm to 8 μm. When heat-resistant layer 70 is excessively thick, the handling properties or the workability of separator 13 may decrease, or it may become more susceptible to a defect such as cracking or peeling, etc. When heat-resistant layer 70 is excessively thin, the short-circuit prevention effect may become lower, or the capacity to retain the electrolyte solution may be reduced. The thickness of heat-resistant layer 70 can be determined by analyzing images taken with a scanning electron microscope (SEM).

Heat-resistant layer 70 has a porosity of 55% or higher. Heat-resistant layer 70 has a porosity of for example, 55% to 75%, or preferably 55% to 68%, or it can be 65% to 68%. When the porosity of heat-resistant layer 70 is excessively high, the effect to suppress the thermal contraction of resin layer 60 may be reduced, or it may become more susceptible to a defect such as cracking or peeling, etc. On the other hand, when the porosity of heat-resistant layer 70 is excessively low, the ionic conductivity of separator 13 may decrease, degrading the high-rate discharge properties.

The porosity of heat-resistant layer 70 can be calculated as follows: The apparent volume occupied by heat-resistant layer 70 having a unit surface area is denoted with V1 (cm$^3$). The ratio of the weight W (g) of heat-resistant layer 70 to the true density $\rho$ (g/cm$^3$) of the material constituting heat-resistant layer 70, W/$\rho$, is denoted with V0. Here, the percent porosity of heat-resistant layer 70 can be calculated by (V1−V0)/V1×100. The thickness of heat-resistant layer 70 is necessary for calculation of the apparent volume V1, and the thickness can be determined by analyzing images taken with a scanning electron microscope (SEM). The weight W of heat-resistant layer 70 can be measured as follows: In particular, a piece having a prescribed surface area is cut out from separator 13 to prepare a specimen, and the weight thereof is measured. Subsequently, the weight of resin layer 60 having the prescribed surface area is subtracted from the weight of the specimen to determine the weight of heat-resistant layer 70 having the prescribed surface area. By converting the weight of heat-resistant layer 70 thus calculated to a weight per unit surface area, the weight W (g) of heat-resistant layer 70 can be determined.

The average pore diameter of heat-resistant layer 70 is not particularly limited. It can be, for instance, within a range of 0.01 μm to 10 μm, or it may be within a range of 0.1 μm to 4 μm. The average pore diameter can be measured with a commercially-available mercury porosimeter or the like.

The heat-resistant layer 70 has a 90° peel strength of, for instance, 2.9 N/m to 15.1 N/m, or preferably 6 N/m to 15.1 N/m to resin layer 60. The "90° peel strength" in the present description refers to a peel strength measured based on JIS-C6481-1995. When the peel strength is low, heat-resistant layer 70 is more susceptible to peeling, and when an internal short circuit occurs, it tends to become unable to effectively suppress the thermal contraction of resin layer 60, leading to an extensive internal short circuit. On the other hand, when the peel strength is high, the flexibility of separator 13 may decrease, and the assembly ease of the separator tends to decline.

Lithium-ion secondary battery 10 is produced as follows. Firstly, positive electrode 12, negative electrode 14 and separator 13 are fabricated, respectively. Subsequently, these are overlaid and wound into a cylinder to assemble electrode body 11. Electrode body 11 is then placed into case body 152, and non-aqueous electrolyte solution 20 is injected into case body 152. This allows electrode body 11 to be impregnated with non-aqueous electrolyte solution 20. Subsequently, case body 152 is covered with lid 154, and lid 154 and case body 152 are sealed.

Figure 4:
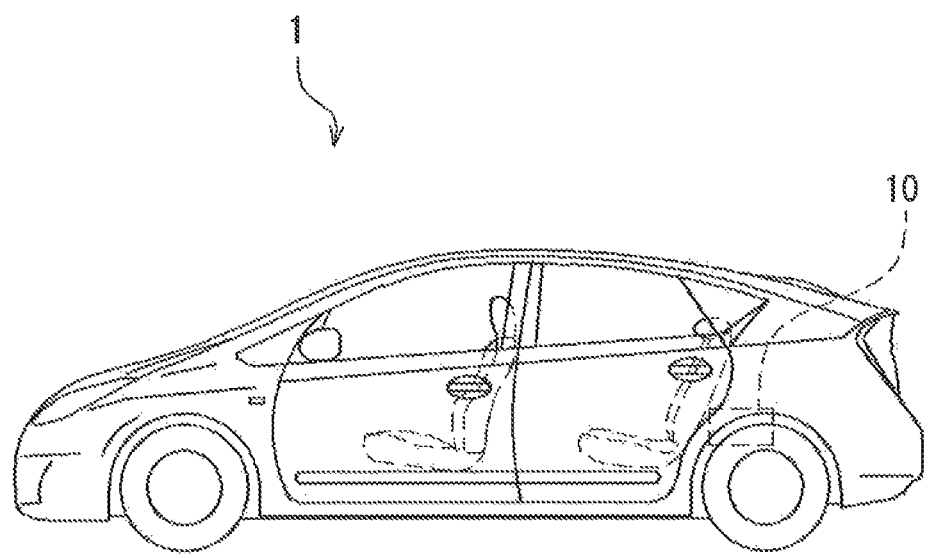
FIG. 4 shows a side view of a vehicle according to an embodiment.

Lithium-ion secondary battery 10 according to the present embodiment can be used as a secondary battery for various purposes. For example, as shown in FIG. 4, it can be loaded on a vehicle 1 such as an automobile, and preferably used as a vehicle-driving power supply such as a motor that drives vehicle 1, and the like. While the type of vehicle is not particularly limited, it is typically a hybrid automobile, an electric automobile, a fuel cell automobile, or the like. Such a lithium-ion secondary battery 10 can be used solely, or as in a battery pack constituted with several batteries connected linearly or in parallel.

Several worked examples relevant to the present invention are described below. However, the present invention is not to be limited to such worked examples.

Example 1

To 85 weight (wt) parts of lithium nickel manganese cobalt oxide (Ni:Mn:Co=1:1:1) having an average particle diameter of 5 μm, 10 wt parts of acetylene black and 5 wt parts of PVDF, NMP was added, and the resultant was compounded to 60 to 70 wt % solid content to prepare a paste for forming positive electrode material layers. The resulting paste was applied to each face of a 15 μm thick aluminum sheet and allowed to dry to form a positive electrode material layer on each face of the aluminum sheet. The aluminum sheet with the positive electrode material layers was rolled to fabricate a positive electrode sheet.

To 98 wt parts of graphite having an average particle diameter of 5 μm, 1 wt part of SBR and 1 wt part of CMC, water was added, and the resultant was compounded to 50 to 60 wt % solid content to prepare a paste for forming negative electrode material layers. The resulting paste was applied to each face of a 10 μm thick copper sheet and allowed to dry to form a negative electrode material layer on each face of the copper sheet. The copper sheet with the negative electrode material layers was rolled to fabricate a negative electrode sheet.

A separator was fabricated as follows: For the resin layer, a 20 μm thick PP-PE-PP three-layer film was obtained. To 97 wt parts of alumina powder ("AKP3000" available from Sumitomo Chemical Co., Ltd.; average particle diameter $D_{50}$ of 0.65 μm) as a filler and 3 wt parts of an acrylic binder, a suitable amount of NMP (a product of Kanto Chemical Co., Inc.) was added, and the resultant was compounded to 45 to 60 wt % solid content in a disperser (dispersion machine "CLEARMIX" available from M Technique Co., Ltd.) to prepare a slurry for forming heat-resistant layers. As for the compounding time, it was subjected to preliminary dispersion at 15000 rpm for 5 minutes followed by full dispersion at 20000 rpm for 15 minutes. Using a kiss-reverse gravure coater, the resulting slurry was applied to a surface of the resin layer and then allowed to dry to form a 5 μm thick heat-resistant layer. The heat-resistant layer had 68% porosity.

The positive electrode, separator and negative electrode were wound to fabricate an electrode body. Into a bottomed cylindrical case body with 18 mm diameter, 65 mm length and 0.5 mm thickness made of nickel-plated mild steel, the electrode body was placed, and an electrolyte solution was injected into the case body. The electrolyte solution contained $LiPF_6$ as a lithium salt, and ethylene carbonate (EC), dimethyl carbonate (DMC) and ethyl methyl carbonate (EMC) as nonaqueous solvents. The electrolyte solution had an $LiPF_6$ concentration of 1 mol/L, and EC:EMC:DMC (volume ratio) was 1:1:1. After the electrolyte solution was injected, the case body was covered with a lid and sealed to fabricate a 800 mAh lithium-ion secondary battery.

Example 2

To prepare a slurry for forming heat-resistant layers, 96 wt parts of alumina powder as the filler and 4 wt parts of the acrylic binder were used. Otherwise in the same manner as Example 1, a lithium-ion secondary battery of Example 2 was fabricated. The heat-resistant layer had 65% porosity.

Example 3

To prepare a slurry for forming heat-resistant layers, 95 wt parts of alumina powder as the filler and 5 wt parts of the acrylic binder were used. Otherwise in the same manner as Example 1, a lithium-ion secondary battery of Example 3 was fabricated. The heat-resistant layer had 60% porosity.

Example 4

To prepare a slurry for forming heat-resistant layers, alumina powder having an average particle diameter $D_{50}$ of 0.5 μm ("AA05" available from Sumitomo Chemical Co., Ltd.) was used as the filler, and 95 wt parts of this alumina powder and 5 wt parts of the acrylic binder were used. Otherwise in the same manner as Example 1, a lithium-ion secondary battery of Example 4 was fabricated. The heat-resistant layer had 65% porosity.

Example 5

To prepare a slurry for forming heat-resistant layers, alumina powder having an average particle diameter $D_{50}$ of 0.3 μm ("AA03" available from Sumitomo Chemical Co., Ltd.) was used as the filler, and 94 wt parts of this alumina powder and 6 wt parts of the acrylic binder were used. Otherwise in the same manner as Example 1, a lithium-ion secondary battery of Example 5 was fabricated. The heat-resistant layer had 67% porosity.

Example 6

To prepare a slurry for forming heat-resistant layers, alumina powder having an average particle diameter $D_{50}$ of 0.3 μm ("AA03" available from Sumitomo Chemical Co., Ltd.) was used as the filler, and 93 wt parts of this alumina powder and 7 wt parts of the acrylic binder were used. Otherwise in the same manner as Example 1, a lithium-ion secondary battery of Example 6 was fabricated. The heat-resistant layer had 68% porosity.

Example 7

To prepare a slurry for forming heat-resistant layers, boehmite powder having an average particle diameter $D_{50}$ of 0.6 μm was used as the filler, and 95 wt parts of this boehmite powder and 5 wt parts of the acrylic hinder were used. Otherwise in the same manner as Example 1, a lithium-ion secondary battery of Example 7 was fabricated. The heat-resistant layer had 65% porosity.

Example 8

To prepare a slurry for forming heat-resistant layers, magnesium hydroxide powder having an average particle diameter $D_{50}$ of 0.7 μm was used as the filler, and 95 wt parts of this magnesium hydroxide powder and 5 wt parts of the acrylic binder were used. Otherwise in the same manner as Example 1, a lithium-ion secondary battery of Example 8 was fabricated. The heat-resistant layer had 55% porosity.

Example 9

To prepare a slurry for forming heat-resistant layers, magnesium carbonate having an average particle diameter $D_{50}$ of 0.7 μm was used as the filler, and 95 wt parts of this magnesium carbonate powder and 5 wt parts of the acrylic binder were used. Otherwise in the same manner as Example 1, a lithium-ion secondary battery of Example 9 was fabricated. The heat-resistant layer had 55% porosity.

Comparative Example 1

To prepare a slurry for forming heat-resistant layers, alumina powder having an average particle diameter $D_{50}$ of 0.65 μm ("AKT3000" available from Sumitomo Chemical Co., Ltd.) was used as the filler, and 98 wt parts of this alumina powder and 2 wt parts of the acrylic binder were used. Otherwise in the same manner as Example 1, a lithium-ion secondary battery of Comparative Example 1 was fabricated. The heat-resistant layer had 70% porosity.

Comparative Example 2

To prepare a slurry for forming heat-resistant layers, alumina powder having an average particle diameter $D_{50}$ of 0.3 μm ("AA03" available from Sumitomo Chemical Co., Ltd.) was used as the filler, and 96 wt parts of this alumina powder and 10 wt parts of the acrylic binder were used. Otherwise in the same manner as Example 1, a lithium-ion secondary battery of Comparative Example 2 was fabricated. The heat-resistant layer had 65% porosity.

Comparative Example 3

To prepare a slurry for forming heat-resistant layers, alumina powder having an average particle diameter $D_{50}$ of 2 μm ("AA03" available from Sumitomo Chemical Co., Ltd.) was used as the filler, and 96 wt parts of this alumina powder and 4 wt parts of the acrylic binder were used. Otherwise in the same manner as Example 1, a lithium-ion secondary battery of Comparative Example 3 was fabricated. The heat-resistant layer had 40% porosity.

[90° Peel Strength Measurement]

With respect to each of the separators of Examples and Comparative Examples, the 90° peel strength was measured on the heat-resistant layer according to a method based on JIS-C6481-1995. For a measurement, a 15 mm by 120 mm sample was used. The sample was fixed to a plate top with a double-faced tape over the heat-resistant layer-bearing face, and the sample was pulled by the resin layer in the direction perpendicular to the heat-resistant layer. The resin layer was peeled continuously over a distance of about 65 mm at a speed of about 20 mm per minute, and the average value of the tensile loading during this procedure was recorded as the peel strength. The measurement results are as shown in Table 1.

sample was subjected to a preliminary charging by constant current/constant voltage (CCCV) charging at 5 A to 3.5 V. The

TABLE 1

| | Filler | Size distribution | Particle shape | Average particle diameter (μm) | Binder content (wt %) | Porosity (%) | Peel strength (N/m) | Internal short circuit test | Winding misalignment | Rate of increase in IV resistance | Capacity retention rate (%) |
|---|---|---|---|---|---|---|---|---|---|---|---|
| Ex. 1 | Alumina | Bimodal | Necking | 0.65 | 3 | 68 | 2.9 | 0/10 | 0/50 | 1.14 | 71.2 |
| Ex. 2 | Alumina | Bimodal | Necking | 0.65 | 4 | 65 | 4.3 | 0/10 | 0/50 | 1.15 | 73.6 |
| Ex. 3 | Alumina | Bimodal | Necking | 0.65 | 5 | 60 | 6.2 | 0/10 | 0/50 | 1.17 | 80.2 |
| Ex. 4 | Alumina | Monodisperse | Spherical | 0.5 | 5 | 65 | 7.5 | 0/10 | 0/50 | 1.14 | 81.3 |
| Ex. 5 | Alumina | Monodisperse | Spherical | 0.3 | 6 | 67 | 10.1 | 0/10 | 0/50 | 1.12 | 81.8 |
| Ex. 6 | Alumina | Monodisperse | Spherical | 0.3 | 7 | 68 | 15.1 | 0/10 | 0/50 | 1.13 | 82.8 |
| Ex. 7 | Boehmite | Monodisperse | Plate | 0.6 | 5 | 65 | 6.5 | 0/10 | 0/50 | 1.15 | 80.7 |
| Ex. 8 | Magnesium hydroxide | Monodisperse | Hexagonal plate | 0.7 | 5 | 55 | 6.3 | 0/10 | 0/50 | 1.18 | 81.7 |
| Ex. 9 | Magnesium carbonate | Monodisperse | Cubic | 0.7 | 5 | 55 | 6.2 | 0/10 | 0/50 | 1.17 | 80.4 |
| Comp. Ex. 1 | Alumina | Bimodal | Necking | 0.65 | 2 | 70 | 1.8 | 4/10 | 0/50 | 1.14 | 70.1 |
| Comp. Ex. 2 | Alumina | Monodisperse | Spherical | 0.3 | 10 | 65 | 17.5 | 0/10 | 8/50 | 1.16 | 82.9 |
| Comp. Ex. 3 | Alumina | Monodisperse | Spherical | 2 | 4 | 40 | 2.5 | 0/10 | 0/50 | 1.87 | 72.6 |

According to Examples 1 to 9, the peel strength ranged from 2.9 N/m to 15.1 N/m. According to Examples 4 to 6 where the average particle diameter $D_{50}$ of the filler ranged from 0.3 μm to 0.5 μm, the peel strength was 7.5 N/m to 15.1 N/m, being relatively high.

[Internal Short Circuit Test]

Based on JIS C8714, an internal short circuit test was carried out, using an L-shaped nickel piece. With respect to each of Examples and Comparative Examples, 10 samples were subjected to the test, and the number of samples that generated heat due to short circuits was investigated. The results are as shown in Table 1 above. As for Comparative Example 1, four samples generated heat due to short circuits. It is presumed that in Comparative Example 1, having a low peel strength of 1.8 N/m, when an internal short circuit occurred due to a foreign body, the heal-resistant layer peeled off the resin layer and was unable to sufficiently suppress the thermal contraction of the resin layer. With respect to Examples 1 to 9, it was confirmed that none of them resulted in heat generation due to short circuits.

[Winding Misalignment Test]

50 samples for each of Examples and Comparative Examples were subjected to X-ray analysis to observe the presence or absence of winding misalignment in the electrode body. For example, a sample in which the positive electrode or the negative electrode was not entirely covered with the separator, and a sample in which the positive electrode was not entirely covered with the negative electrode were deemed positive for the presence of winding misalignment. The results are as shown in Table 1. For Comparative Example 2, the presence of winding misalignment was observed in 8 samples. With respect to Comparative Example 2, having a high peel strength of 17.5 N/m, the heat-resistant layer was strongly adhered to the resin layer. It is presumed that this decreased the flexibility of the separator, making it difficult to be properly winded. With respect to Examples 1 to 9, it was confirmed that winding misalignment was absent in all the samples.

[Measurement of Rate of Increase in IV Resistance]

A sample of each of Examples and Comparative Examples was subjected to an initial IV resistance measurement. The IV resistance was measured as follows: In particular, each preliminary charging was carried out for a total of one hour. By this, each sample was adjusted to 60% SOC (state of charge). Subsequently, it was subjected to a constant current (CC) discharging at 60 A for 10 seconds, and from the slope of the linear regression line of the plot of the voltage (V) vs. the current (I) recorded during this procedure, the internal resistance (IV resistance) was determined.

It was subjected to charging at a charging current of 5 C at 25° C. followed by a high-rate discharging (at a discharging current of 20 C) in an environment at −15° C. After the discharging, the IV resistance was measured and the ratio of the IV resistance after the discharging to the initial IV resistance was determined. This ratio indicates the degree of change in the IV resistance due to the high-rate discharging in the low temperature environment. It can be considered that as this ratio was higher, the performance suffered greater degradation due to the high-rate discharging in the low temperature environment. The results are as shown in Table 1.

In Comparative Example 3 with 40% porosity, the ratio was 1.87, indicating extensive degradation. According to Examples 1 to 9, the ratio ranged from 1.12 to 1.18, being lower than the ratio of Comparative Example 3. It can be seen that Examples 1 to 9 had greater high-rate discharge properties at a low temperature as compared to Comparative Example 3.

[Measurement of Capacity Retention Rate]

A sample of each of Examples and Comparative Examples was subjected to 1000 cycles of charging and discharging in an environment at 60° C., with one cycle being a set of charging and discharging. Charging and discharging were carried out at a constant current of 2 C at 60° C. After carrying out 1000 cycles of charging and discharging, the final battery capacity was measured, and the percentage of the final battery capacity to the initial battery capacity was determined as the capacity retention rate. As this percentage was higher, the battery would be considered to be less susceptible to degradation in the performance. The results are as shown in Table 1 and FIG. 5.

Figure 5:
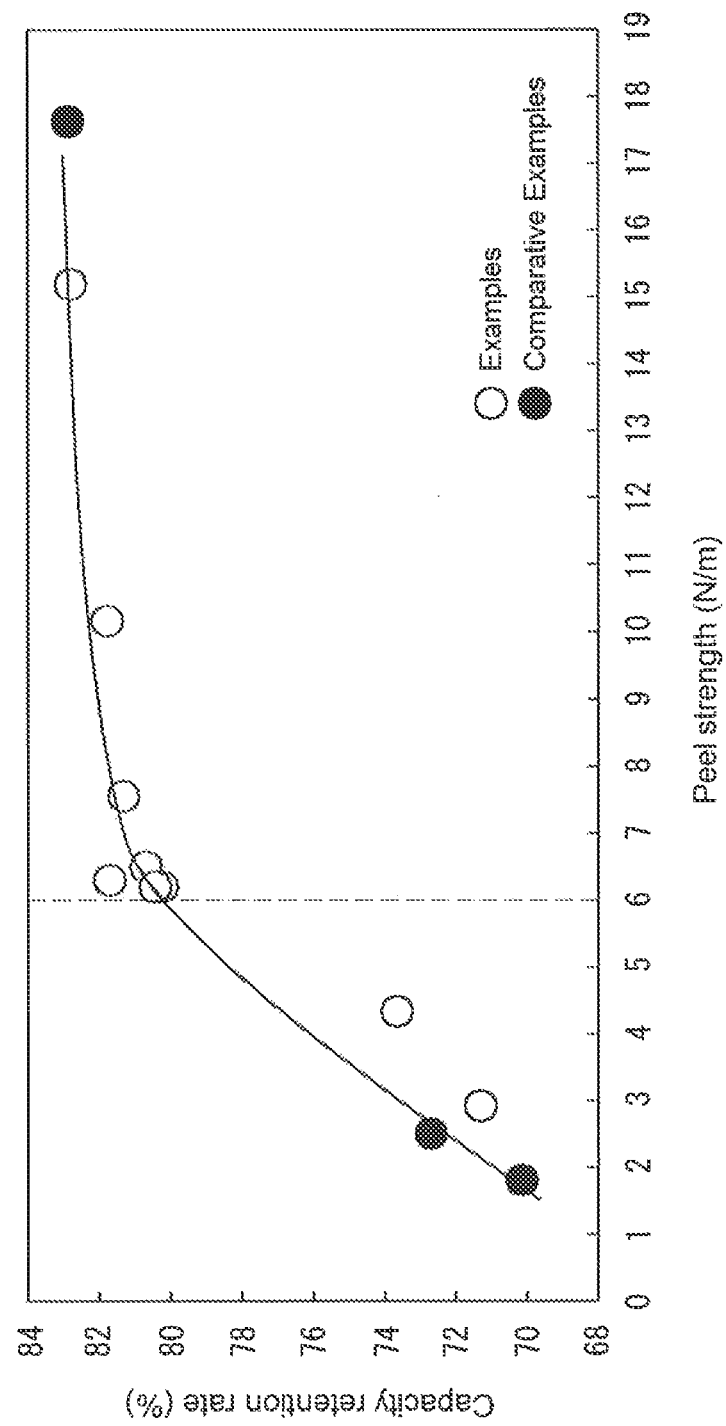
FIG. 5 shows a graph illustrating the relationship between the peel strength and the capacity retention rate with respect to Examples and Comparative Examples.

From FIG. 5, it can be seen that when the peel strength was 6 N/m or higher, the capacity retention rate was maintained at a high level. From Table 1, it can be seen that according to Examples 3 to 9 each exhibiting a peel strength of 6 N/m or higher resulted in a capacity retention rate of 80% or higher. From Table 1, it can be seen that according to Examples 3 to 9 each with a 5 wt % to 7 wt % binder content, the peel strength was 6 N/m or higher.

Although specific embodiments of the present invention have been described in detail above, these are merely for illustrations, and the invention disclosed herein includes various modifications and changes of the specific embodiments illustrated above.

The invention claimed is:

1. A non-aqueous electrolyte secondary battery comprising a positive electrode, a negative electrode, a separator placed between the positive electrode and the negative electrode, and a non-aqueous electrolyte impregnated at least in the separator, wherein:

the positive electrode, the separator and the negative electrode are overlaid on top of each other and wound, the separator comprises a porous resin layer, and a porous heat-resistant layer overlaid at least on a first face of the resin layer; and the heat-resistant layer comprises a filler consisting of an inorganic material, and a binder, wherein:

the heat-resistant layer has a porosity of 55% to 68%, and the heat-resistant layer exhibits a 90° peel strength of 2.9 N/m to 15.1 N/m to the resin layer, the filler has an average particle diameter of 0.3 μm to 0.7 μm, and the filler and the binder are contained at a weight ratio of 93:7 to 95:5.

2. The non-aqueous electrolyte secondary battery according to claim 1, wherein the heat-resistant layer exhibits a 90° peel strength of 6 N/m to 15.1 N/m to the resin layer.

3. The non-aqueous electrolyte secondary battery according to claim 1, wherein the filler has an average particle diameter of 0.3 μm to 0.5 μm.

4. The non-aqueous electrolyte secondary battery according to claim 1, wherein the filler consists of at least one species of material selected from a group consisting of alumina, boehmite, magnesium hydroxide and magnesium carbonate.

5. A vehicle comprising the non-aqueous electrolyte secondary battery according to claim 1 as a driving power supply.

* * * * *